United States Patent
Wang et al.

(10) Patent No.: US 10,547,044 B2
(45) Date of Patent: Jan. 28, 2020

(54) DRY POWDER BASED ELECTRODE ADDITIVE MANUFACTURING

(71) Applicants: Worcester Polytechnic Institute, Worcester, MA (US); The Curators of the University of Missouri, Rolla, MO (US)

(72) Inventors: Yan Wang, Worcester, MA (US); Zhangfeng Zheng, Worcester, MA (US); Brandon Ludwig, Rolla, MO (US); Heng Pan, Rolla, MO (US)

(73) Assignees: Worcester Polytechnic Institute, Worcester, MA (US); The Curators of the University of Missouri, Columbia, MO (US)

(*) Notice: Subject to any disclaimer, the term of this patent is extended or adjusted under 35 U.S.C. 154(b) by 21 days.

(21) Appl. No.: 15/252,481

(22) Filed: Aug. 31, 2016

(65) Prior Publication Data
US 2017/0062798 A1    Mar. 2, 2017

Related U.S. Application Data

(60) Provisional application No. 62/212,708, filed on Sep. 1, 2015.

(51) Int. Cl.
*H01M 4/04* (2006.01)
*H01M 4/485* (2010.01)
(Continued)

(52) U.S. Cl.
CPC ....... *H01M 4/0419* (2013.01); *H01M 4/0435* (2013.01); *H01M 4/0471* (2013.01);
(Continued)

(58) Field of Classification Search
CPC ............ H01M 4/0419; H01M 4/0404; H01M 4/0435; H01M 4/0471; H01M 4/485;
(Continued)

(56) References Cited

U.S. PATENT DOCUMENTS 5,785,784 A * 7/1998 Chesley ............. A44B 18/0049
156/231
6,048,372 A * 4/2000 Mangahara ............. H01M 4/04
29/623.5

(Continued)

FOREIGN PATENT DOCUMENTS

JP    2002042787 A  *  2/2002
RU    2004137799 A1    6/2011
(Continued)

OTHER PUBLICATIONS

JP-2002042787-A, Machine Translation, originally published 2002, p. 1-15 (Year: 2002).*

(Continued)

*Primary Examiner* — Katherine A Bareford
*Assistant Examiner* — Christina D McClure
(74) *Attorney, Agent, or Firm* — Armis IP Law, LLC

(57) ABSTRACT

A dry electrode manufacturing process employed for low cost battery through a dry mixing and formation process. A thermal activation renders the dry fabricated electrode comparable to conventional slurry casted electrodes. The dry electrode mixture results from a combination of a plurality of types of constituent particles, including at least an active charge material and a binder, and typically a conductive material such as carbon. The process heats the deposited mixture to a moderate temperature for activating the binder for adhering the mixture to the substrate; and compresses the
(Continued)

deposited mixture to a thickness for achieving an electrical sufficiency of the compressed, deposited mixture as a charge material in a battery.

15 Claims, 9 Drawing Sheets

(51) Int. Cl.
```
H01M 4/62      (2006.01)
H01M 4/505     (2010.01)
H01M 4/525     (2010.01)
H01M 4/58      (2010.01)
B05D 3/12      (2006.01)
B05B 5/03      (2006.01)
```

(52) U.S. Cl.
CPC ............... *B05B 5/032* (2013.01); *B05D 3/12* (2013.01); *H01M 4/485* (2013.01); *H01M 4/505* (2013.01); *H01M 4/525* (2013.01); *H01M 4/5825* (2013.01); *H01M 4/623* (2013.01); *H01M 4/625* (2013.01)

(58) Field of Classification Search
CPC .... H01M 4/505; H01M 4/525; H01M 4/5825; H01M 4/623; H01M 4/625; H01M 10/052; B05B 5/1683; B05B 5/032; B05D 3/0254; B05D 3/12
See application file for complete search history.

(56) References Cited

U.S. PATENT DOCUMENTS

| | | | | |
|---|---|---|---|---|
| 2002/0007869 | A1* | 1/2002 | Pui | B05B 1/14 |
| | | | | 141/173 |
| 2006/0024484 | A1* | 2/2006 | Kendrick | B32B 5/02 |
| | | | | 428/292.1 |
| 2008/0020283 | A1* | 1/2008 | Miyashiro | B82Y 30/00 |
| | | | | 429/322 |
| 2009/0117461 | A1* | 5/2009 | Shembel | H01M 4/0404 |
| | | | | 429/217 |
| 2009/0148377 | A1* | 6/2009 | Moshage | C01B 25/45 |
| | | | | 423/306 |
| 2009/0181304 | A1* | 7/2009 | Miyamoto | C23C 14/3414 |
| | | | | 429/218.1 |
| 2011/0129732 | A1* | 6/2011 | Bachrach | H01M 4/134 |
| | | | | 429/220 |
| 2011/0262802 | A1* | 10/2011 | Uono | B82Y 30/00 |
| | | | | 429/188 |
| 2013/0062802 | A1* | 3/2013 | Goda | A61F 13/15658 |
| | | | | 264/37.28 |
| 2013/0309414 | A1* | 11/2013 | Eskra | H01M 4/0404 |
| | | | | 427/557 |
| 2014/0127570 | A1* | 5/2014 | Dandrea | H01M 4/0435 |
| | | | | 429/211 |
| 2014/0193718 | A1* | 7/2014 | Harada | H01M 10/0562 |
| | | | | 429/322 |

FOREIGN PATENT DOCUMENTS

RU       2012108651 A    9/2013
RU       2516731 C2      6/2014

OTHER PUBLICATIONS

Barsykov, V. and Khomenko, V., "The Influence of Polymer Binders on the Performance of Cathodes for Lithium-Ion Batteries", Scientific Journal of Riga Technical University, 21:67-71 (2010).

Chen, C.H., et al., "Electrostatic Spray Deposition of Thin Layers of Cathode Materials for Lithium Battery", Solid State Ionics, 86-88:1301-1306 (1996).

International Search Report, PCT/US2016/050096, Dec. 8, 2016, pp. 8.

* cited by examiner

US 10,547,044 B2

DRY POWDER BASED ELECTRODE ADDITIVE MANUFACTURING

RELATED APPLICATIONS

This patent application claims the benefit under 35 U.S.C. § 119(e) of U.S. Provisional Patent App. No. 62/212,708, filed Sep. 1, 2015, entitled "PRINTED ELECTRODE," incorporated by reference in entirety.

BACKGROUND

Rechargeable batteries such as lithium batteries are widely employed in electric vehicles, as well as portable electronics such as laptops, phones, tablets and various personal devices. Such batteries are formed in a variety of configurations to suit the size constraints as well as the electrical characteristics of the powered device. Regardless of size and application, however, manufacturing of lithium-ion battery electrodes as well as other batteries employs an electrode mixture applied to an electrode surface. The electrode mixture results from a precise combination of materials, typically charge, conductive and binder materials, and is often applied in a slurry form to facilitate even distribution and homogenous combination of the constituent materials.

SUMMARY

A dry powder based electrode manufacturing process for a rechargeable battery deposits, onto a substrate defined by a planar electrode, a dry electrode mixture resulting from a fluidized combination of a plurality of types of constituent particles, such that the particle types include at least an active charge material and a binder, and typically a conductive material such as carbon. The process heats the deposited mixture to a moderate temperature for activating the binder for adhering the mixture to the substrate, and compresses the deposited mixture to a thickness for achieving an electrical sufficiency of the compressed, deposited mixture as an electrode material in a battery.

Configurations herein are based, in part, on the observation that rechargeable batteries enjoy continued demand as the popularity of hybrid and electric vehicles increases. Ongoing recharge cycles are expected of electric vehicle batteries, and the electrical requirements of such vehicles are particularly amenable to lithium batteries because of the rechargeability characteristics. Unfortunately, conventional approaches to manufacture of rechargeable batteries require a solvent based approach for combining and applying the charge material to an anode or cathode current collector. Substantial drying times and heating are required to evaporate the solvent and cure or bind the charge material onto the anode or cathode current collector. Accordingly, configurations herein substantially overcome the above described shortcomings of conventional battery formation by providing a dry powder based manufacturing on a substrate for eliminating the solvent and associated heating and drying times from the battery electrode manufacturing process.

Conventional approaches to commercial Li-ion battery electrodes are manufactured by casting a slurry onto a metallic current collector. The slurry contains active material, conductive carbon, and binder in a solvent. The binder, most commonly polyvinylidene fluoride (PVDF), is pre-dissolved in the solvent, most commonly N-Methyl-2-pyrrolidone (NMP). After uniformly mixing, the resulting slurry is cast onto the current collector and dried. Evaporating the solvent to create a dry porous electrode is needed to fabricate the battery electrode. Drying can take a wide range of time with some electrodes taking 12-24 hours at 120° C. to completely dry.

Electrodes manufactured with dry particles coated on current collectors represent an improved manufacturing process, thereby eliminating solvents and the associated shortcomings. Dry electrode manufacturing has been achieved through a variety of methods such as pulsed laser and sputtering deposition, however certain drawbacks still remain. Pulsed-laser deposition is achieved by focusing a laser onto a target body containing the to-be-deposited material. Once the laser engages the target, the material is vaporized and deposited onto the collecting substrate. Although solvent is not used, the deposited film has to be subjected to very high temperatures (650-800° C.) to anneal the film. Deposition via magnetron sputtering can lower the required annealing temperature to 350° C. These conventional approaches both suffer from very slow deposition rates and high temperature needs for annealing.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The figures and discussion below depict an example approach for forming the electrode material in a rechargeable battery by spraying, depositing or applying the electrode material to the substrate in a dry powder form, such as to an anode or cathode current collector. In the example configuration, an application of cathode material such as Lithium cobalt oxide ($LiCoO_2$) as the active charge material is shown in conjunction with binder and conductive materials (typically carbon) in various ratios by selective, dynamic combinations of dry powder formations.

Figure 1:
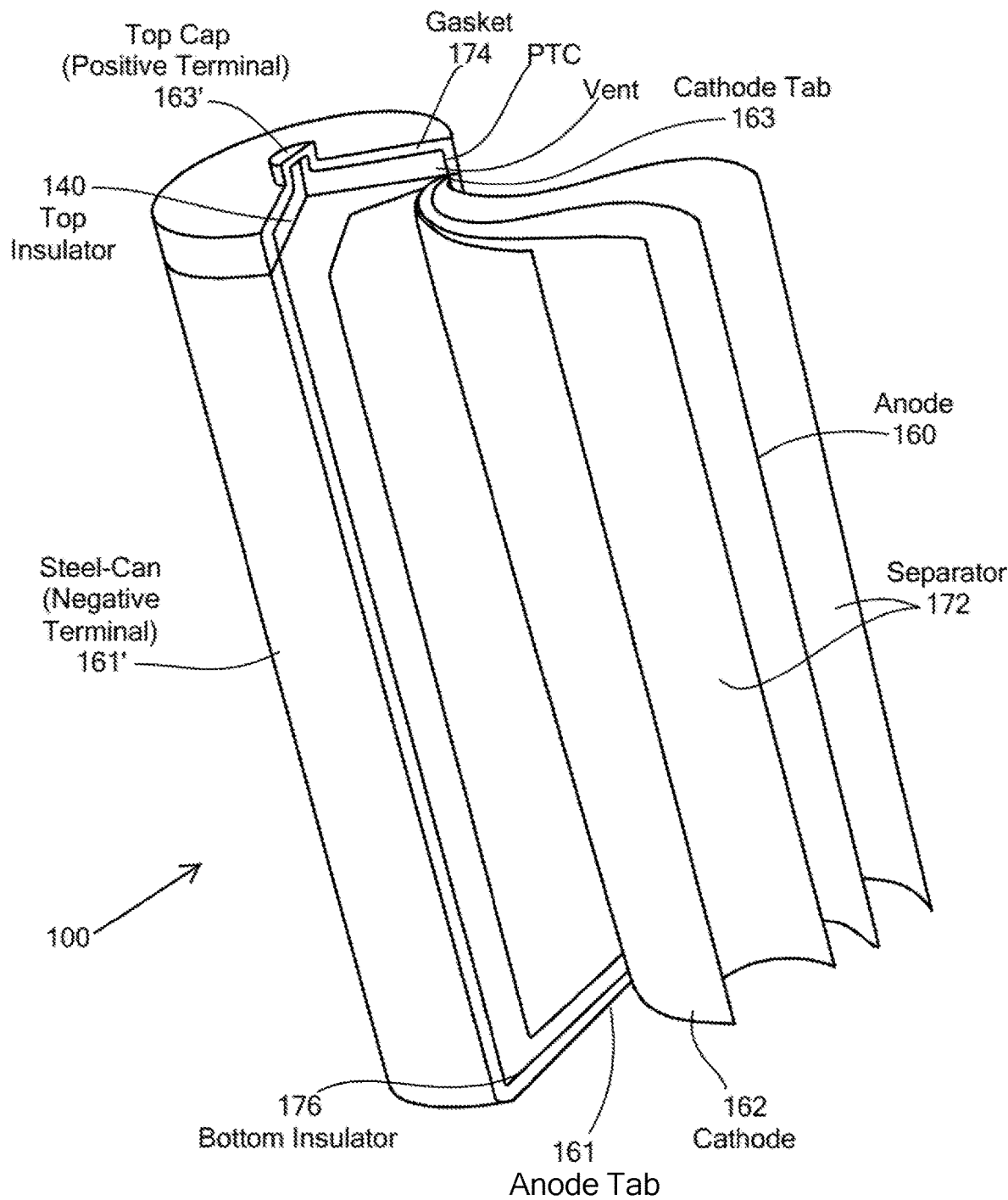
FIG. 1 is a context diagram of a battery incorporating the dry coated substrate as disclosed herein.

FIG. 1 is a context diagram of a battery incorporating the dry electrode mixture applied to a substrate as disclosed herein, and depicts a battery structure suitable for use with configurations discussed below. Referring to FIG. 1, the physical structure of a cell 100 is a cylinder encapsulation of a rolled sheets defining the anode (negative electrode) 160 and the cathode (positive electrode) 162. In the configurations herein, the dry electrode mixture is applied to a substrate such as copper or aluminum for forming the anode 160 and cathode 162. Typically, the planar substrate is rolled into a cylindrical shape (cell), and assembled into a configuration of cells connected to achieve the desired voltage and current characteristics, however the approach disclosed herein is applicable to any suitable anode or cathode substrate, such as prismatic cells which retain a planar shape.

Primary functional parts of the lithium-ion battery are the anode 160, cathode, 162 electrolyte, and separator 172. The most commercially popular anode 160 (negative) electrode material contains graphite, carbon and PVDF (polyvinylidene fluoride) binder, coated on copper foil. The cathode 162 (positive) electrode contains cathode material, carbon, and PVDF binder, coated on aluminum foil. The cathode 162 material is generally one of three kinds of materials: a layered oxide (such as lithium cobalt oxide or lithium nickel cobalt manganese oxide), a polyanion (such as lithium iron phosphate), or a spinel (such as lithium manganese oxide). The outside metal casing defines the negative terminal 161', coupled to the anode tab 161, above a top insulator 140, and the top cap 163' connects to the cathode tab 163. A gasket 174 and bottom insulator 176 maintains electrical separation between the polarized components. Configurations discussed below describe formation of the anode 160 and cathode 162 by application of the dry electrode mixture to a planer substrate.

Figure 2:
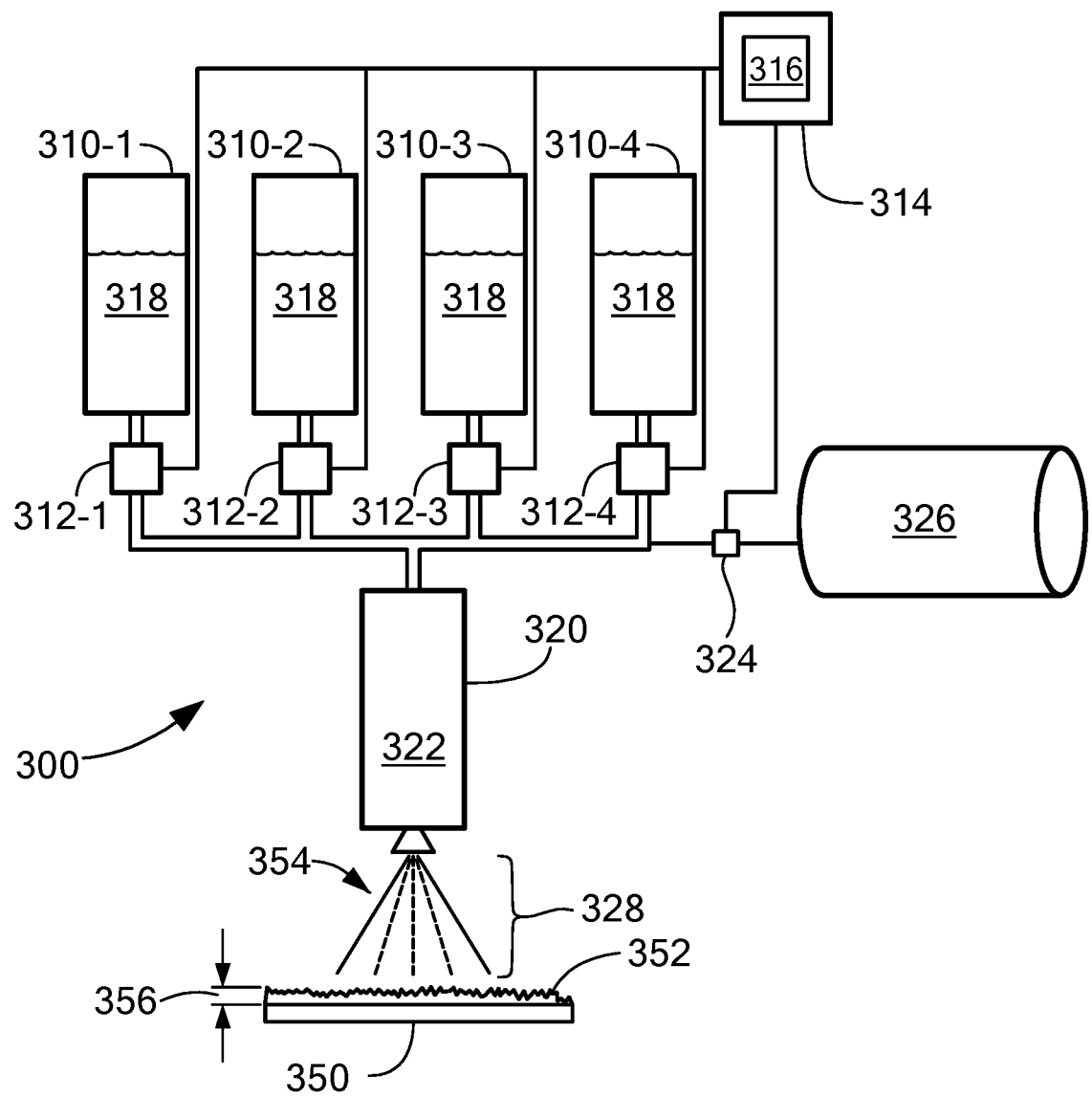
FIG. 2 is a diagram of a deposition/dry spray apparatus for forming the substrate as in FIG. 1.

FIG. 2 is a diagram of a deposition/dry spray apparatus for forming the electrodes as in FIG. 1. Referring to FIGS. 1 and 2, a powder dispensing unit 300 includes a plurality of hoppers 310-1 . . . 310-4 (310 generally). Each of the hoppers 310 is adapted for containing a volume 318 of a type of powder in the form of constituent particles that define a charge material, conductor, and binder for inclusion in the battery. Metering valves 312-1 . . . 312-4 (312 generally) on each hopper 310 are responsive to a controller 314 for dispensing precise amounts of each of the plurality of types of constituent particles (powder). A spray gun 320 includes a fluidizing chamber 322 and may include a connection 324 to a carrier gas 326. The fluidizing chamber 322 has a length sufficient to evenly distribute the constituent particles into a uniform mixture for deposition on a substrate 350, and operates as a homogenizing chamber for evenly dispersing the particles for a uniform ratio of deposited materials. Based on a predetermined distribution, provided by a control program or similar logic 316, the controller 314 actuates the metering valves 312 to achieve a mixture ratio of the constituent particles, and may dynamically adjust the mixture ration for depositing or "painting" a layered structure of differing mixture ratios onto the substrate 350, discussed further below. The different powder types can be mixed together first and then sprayed on the current collector. The electrode material resulting from the mixture of the constituent particles may be applied to the substrate 350 by any suitable mechanism, such as electrostatic spray or deposition into a mold to form a molded structure with enhanced thickness, both described below. The term "deposited" is directed to any such application of the dry powder electrode mixture to a substrate 350 surface for forming an electrode in the manufactured battery.

During battery electrode manufacturing, the disclosed method of depositing the electrode material on a planar electrode (substrate 350) includes depositing, onto the substrate 350, a dry electrode mixture 354 resulting from a fluidized combination of a plurality of types of constituent particles, in which the particle types in the electrode material include at least an active charge material, conductive additive and a binder. Deposition may be achieved by pressurized carrier gas 326 metered through valve 324, gravity driven dispersant, or other suitable process. A particle spray 328 carries the fluidized, mixed constituent particles onto the substrate 350. The substrate 350 is intended to be any suitable material for forming the anode or cathode in the manufactured battery, and is expected to be a conductive sheet material such as aluminum or copper adapted for use as a current collector. Following deposition, the substrate and the deposited mixture 352 are heated to activate the binder for adhering the mixture to the substrate and providing firmness or structure for maintain a thickness 356 of the deposited mixture 352. Following deposition, a system of rollers or other suitable mechanism compresses the deposited mixture 352 to a thickness 356 for achieving an electrical sufficiency of the compressed, deposited mixture as an electrode in a battery.

An example of the constituent particles used for dry powder based electrodes, the mixture 352 includes active (90% by weight), conductive (5% by weight), and binding material (5% by weight). In a particular configuration, Lithium cobalt oxide ($LiCoO_2$, or simply LCO) was used as the active material, Super C65 Carbon (C65) as the conductive material, and PVDF for the binding material.

One particular approach may employ an electrostatic spraying system to deposit dry electrode particles to the substrate. The process is commonly known as dry painting or electrostatic spraying. It consists of a powder pick-up and dispensing unit (such as a Venturi pump) and an electrostatic spraying gun. A spraying gun is used to charge the fluidized dry particles. After being charged, the dry particles will be drawn to the ground current collector and deposited. A hot roller is used to control the electrode thickness and density in place of the doctor blade typically used to control the thickness of a slurry-cast electrode. Thermal activation of the binding material is quickly achieved using the hot roller, which takes the place of the oven needed to evaporate solvent in a slurry-cast electrode.

Figure 3:
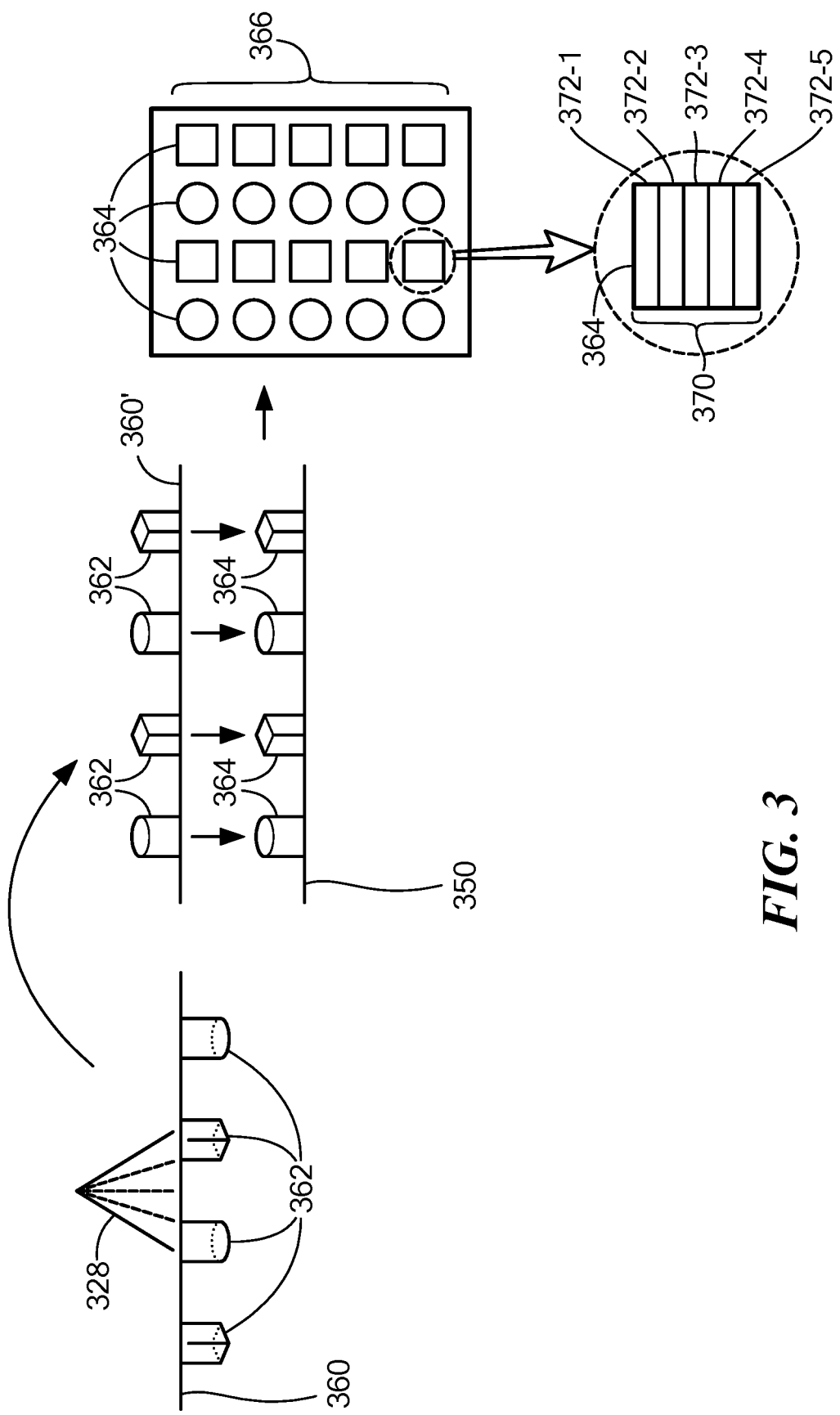
FIG. 3 is a diagram of mold based substrate formation in the approach of FIG. 2.

FIG. 3 is a diagram of mold based electrode manufacturing. In a particular configuration, the particle is deposited onto the flat planer surface defined by the substrate 350. In another configuration, an arrangement of molds 362 provides added structure to the deposited mixture 352. Referring to FIGS. 2 and 3, formation of the deposited mixture 352 includes dispensing the dry electrode mixture onto the mold 360, in which the mold 360 has an array of receptacles 362, such that each receptacle 362 defines a shape and a spacing from adjacent receptacles to form molded structures 364 on the substrate. Following deposition, the process inverts the mold 360' onto the or just above/or adjacent to substrate 350, and releases the molded structures 364 onto the substrate 350 for forming a deposition pattern 366 on the substrate 350 corresponding to the array. In the example configuration, the mold 360 is constructed of aluminum or stainless steel, and/or employs a coating having a low surface energy for facilitating release. Particular configurations may add a release coating using a material having low surface energy material, such as hydrophobic materials. Boron nitride is a particularly beneficial selection due to heat resistance.

In the example configuration, the molded structures 364 may exhibit a layered structure 370 resulting from multiple passes and dynamic adjustment of the fluidized combination of a plurality of types of constituent particles and mixture from adjustment of the metering valves 312. Resulting operation deposits a plurality of layers 372-1~372-5 (372 generally) in the receptacles 362, such that each layer 372 is defined by a predetermined ratio of the types of constituent particles to define the molded structures 364 having a composition defined by the layers 370. Generally, the constituent and mixture particles disposed from the hoppers 310 including at least a binder, a conductor and a charge material as the types of constituent particles. The predetermined ratio at each layer 372 is achieved by metering a dispensed quantity of particles from each of the hoppers 310 according to the predetermined ratio. For example, the dry particle mixture 354 may be adjusted such that the top and bottom layer 372-1 and 372-5 contain the most binder, such as 15% binder with 5% conductive and 80% charge material, a middle layer 372-3 rich in charge material (5% binder, 5% conductive and 90% charge material), and the layers flanking the middle layer (372-2, 372-4) containing a moderate amount (10% binder), to allow enhanced structural integrity from added binder at the top and bottom, thus permitting greater thickness 356 in the molded structure 364.

The dry electrode mixture containing the constituent particles may be defined from a variety of materials. In a particular configuration, the dry electrode mixture includes active materials, binder and conductive additive, such that the active materials may be selected from the group consisting of $LiCoO_2$, $LiNi_xMn_yCo_zO_2$, $Li_2Mn_2O_4$, $LiNiCoAlO_2$, $LiFePO_4$, and $Li_4T_{15}O_{12}$, the binder selected from the group consisting of PVDF, and CMC and other polymers, and the conductive additive selected from the group consisting of carbon powder, nanotube, nanowire, and graphene.

It is expected that some overspray may occur around the molds and result in excess particles on the mold outside the receptacles 362. Accordingly, deposition may include disposing a scraper across a top surface of the mold, the top surface receiving overspray particles from the receptacles 362 and the disposed scraper removing the overspray particles from the top surface.

Figure 4A:
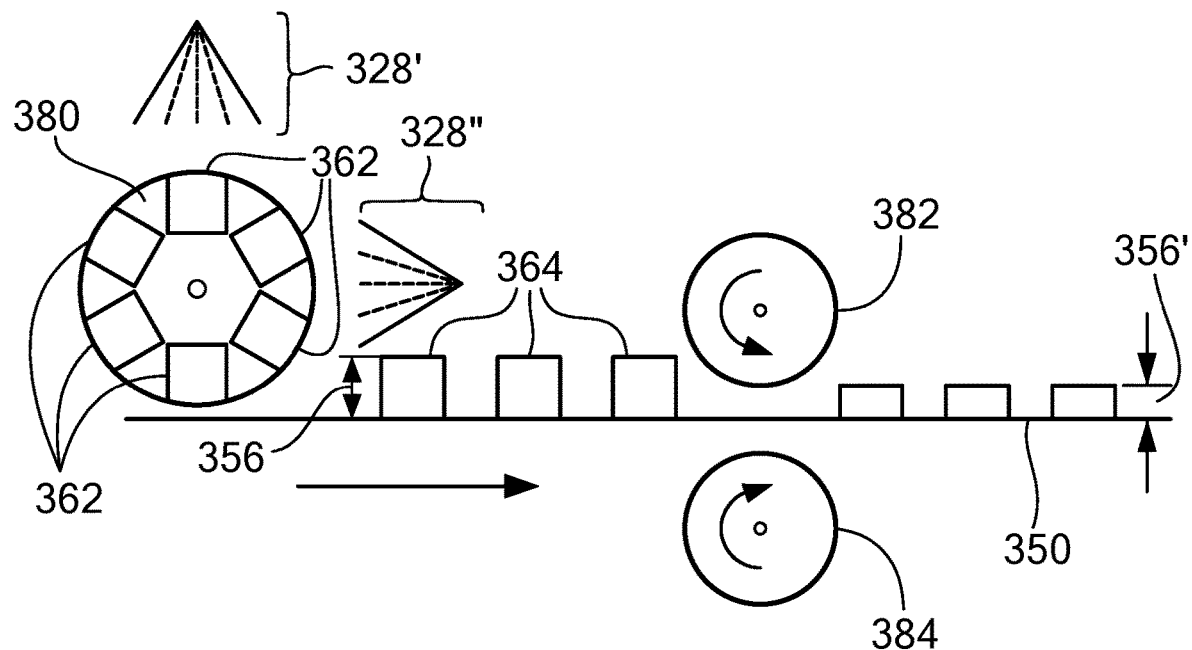
FIG. 4A shows a continuous roller mold configuration of the apparatus of FIG. 3.

FIG. 4A shows a continuous roller mold configuration of the apparatus of FIG. 3. A circular roller 380 implementation of the mold 360 allows a continuous additive and release cycle of the receptacles, amenable to additive manufacturing techniques for the battery electrode manufacturing. Referring to FIGS. 2-4A, the mold 380 is a cylindrical roller adapted to receive the dispensed dry electrode 354 mixture into the receptacles 362 and invert the receptacles 362 by rotation to a release position onto the substrate 350, such that the substrate 350 is operable for conveyance at a speed corresponding to the rotation. Also, there may be multiple particle sprays 328', 328" at various positions around the circular mold 380. An arrangement of rollers, typically top 382 and bottom 384 heated rollers, compresses the molded structures from an initial thickness 356 to a compressed thickness 356'.

Figure 4B:
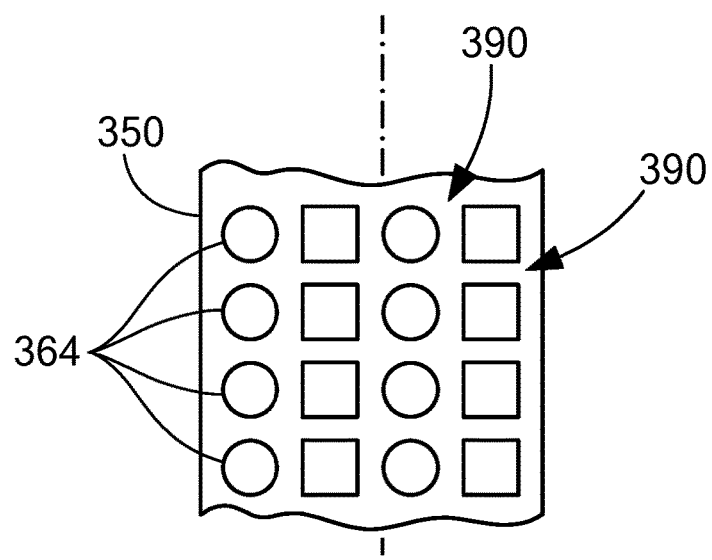
FIGS. 4B and 4C show a resulting electrode from the configuration of FIG. 4A.

A structure including layers 372 typically involves depositing the dry electrode mixture in a plurality of passes, such that each pass deposits a layer 372, and repeating the depositions until the deposited mixture achieves a predetermined thickness 356 and layer arrangement. The controller 314 may dynamically adjust a combination ratio of the deposited mixture 352 by setting the metering valves 312. The combination ratio, as directed by control logic 316 from the controller 314, defines, for each layer, a percentage of each of the types of the plurality of types of particles. The control logic 316 receives input for identifying a plurality of the types of constituent particles 318 in each of the hoppers 310, and meters a quantity of each of the plurality of types based on the predetermined combination ratio from the control logic 316. The spray gun 320 generates a fluidized mixture of the constituent particles according to the metered quantity using a carrier gas 326, and directs the fluidized mixture 354 to the substrate driven by the carrier gas 326 as directed by the valve 324 responsive to the control logic 316. FIG. 4B shows a resulting electrode from the configuration of FIG. 4A having the molded structures 364 arranged in the array based on the mold 360 at a spacing 390.

Figure 4C:
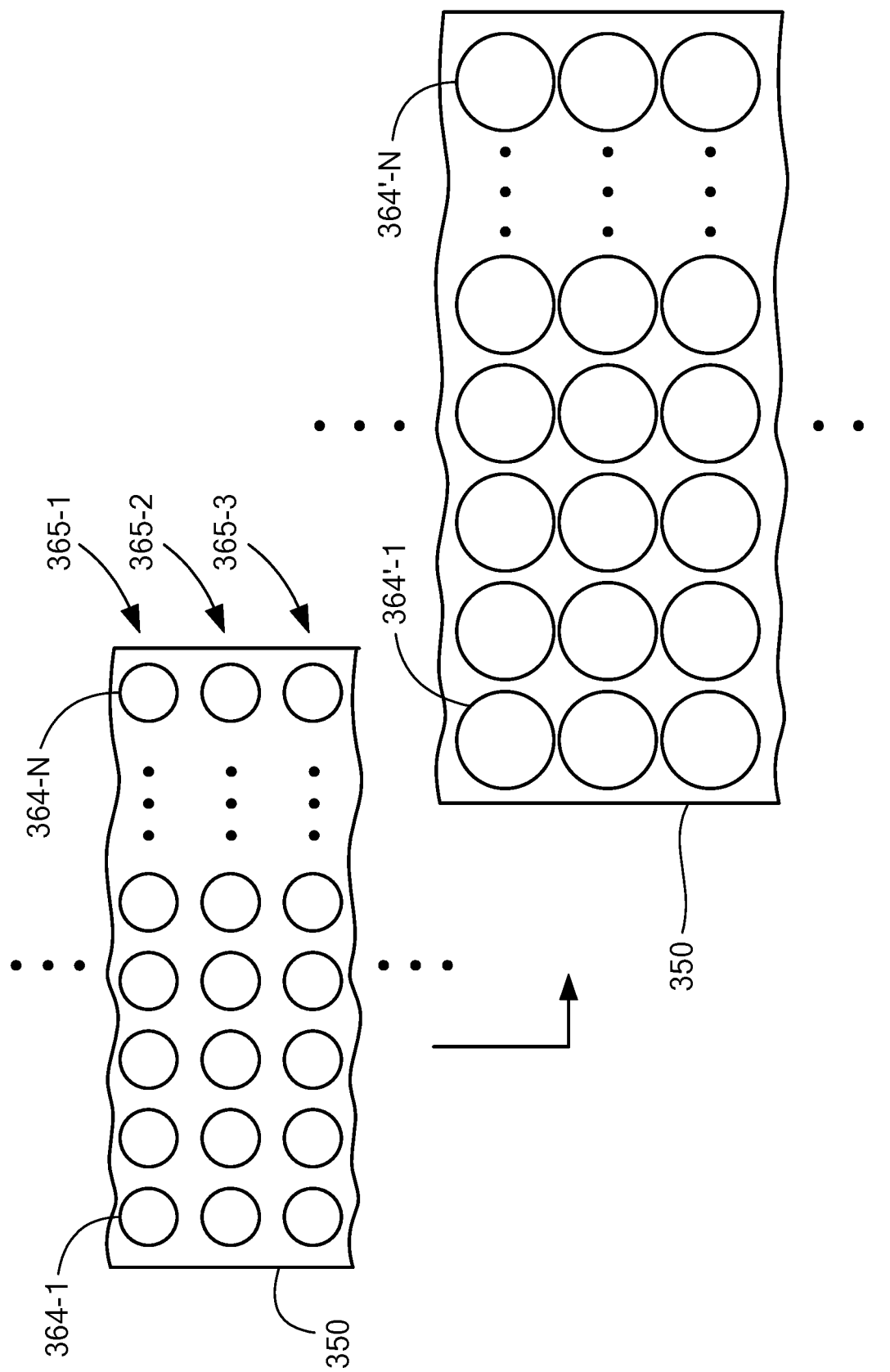

FIG. 4C shows another configuration for the molded structures 364. Referring to FIGS. 4A-4C, any suitable number of molded structures 364-1 . . . 364-n may be deposited along each row 365-1 . . . 365-n on the substrate 350, and may have the same or dissimilar shapes. Following compression by the hot rollers 382, 384, the compressed structures 364'-1 . . . 364'-n expand to fill and/or eliminate any gap between adjacent structures. Further, the substrate 350 may be a continuous substrate for forming any suitable number of rows 365 to be subsequently cut into appropriate sized segments for battery manufacturing.

Figure 5:
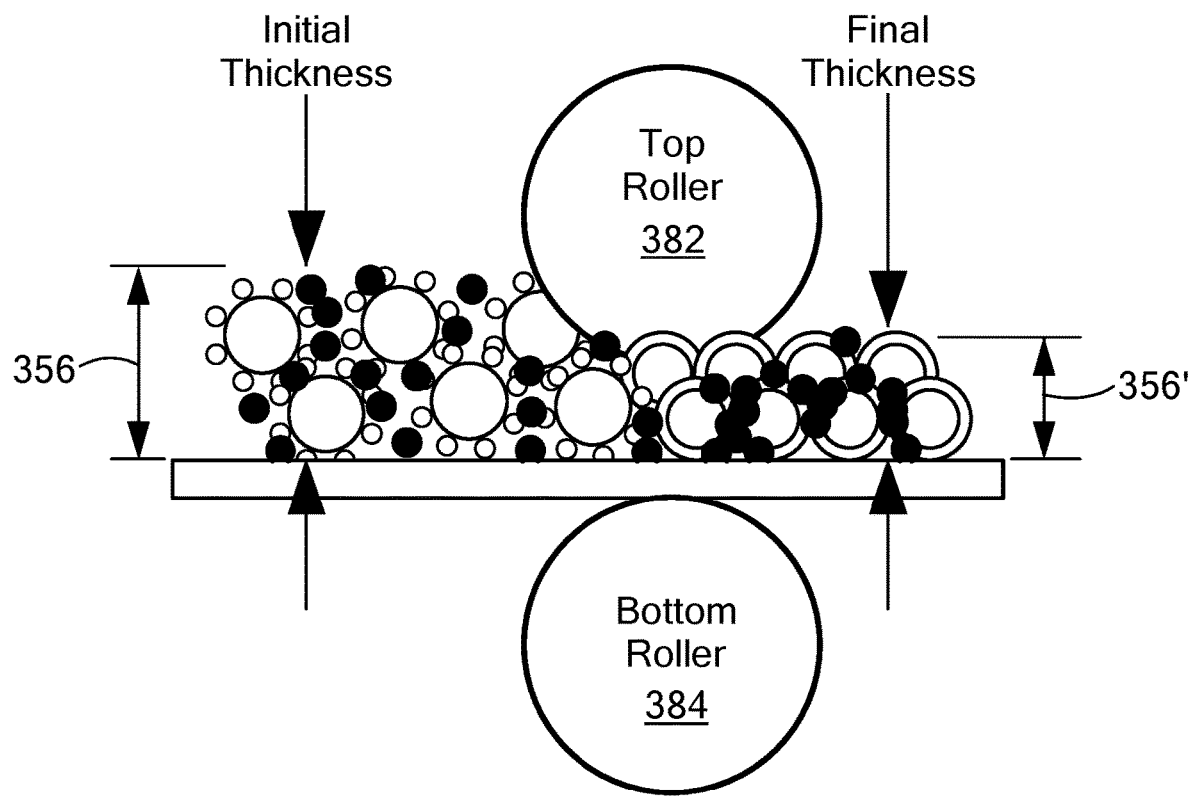
FIG. 5 shows heated rollers for activating the binder in the substrate and electrode as in FIGS. 2-4B.

FIG. 5 shows a further detail of the heated rollers 382, 384 for activating the binder in the substrate and electrode as in FIGS. 2-4, and shows the arrangement of the constituent particles resulting from the reduction in thickness 356, 356'. The reduction in thickness may be substantially around 25% of the deposited thickness 356, in contrast to conventional rollers which compress to only about 40-60%. In a particular configuration, heating performed by the heated rollers 382, 384 have a temperature between 100° C. and 300° C. The electrical sufficiency of the charge material occurs from the thickness reduction to 25% of a deposited electrode mixture thickness, and an initial thickness 356 of the deposited mixture is between 0.2 mm to 3.0 mm.

Figure 6A:
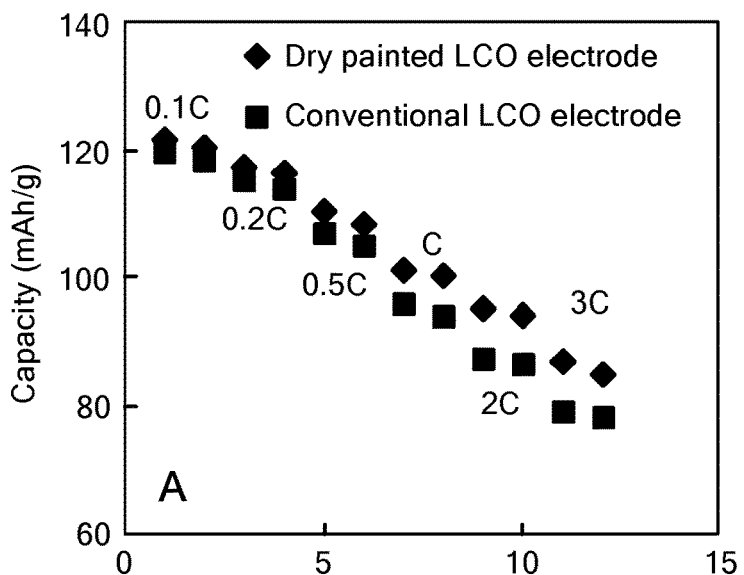
FIGS. 6A-6F show electrical characteristics of the dry electrode mixture.
Figure 6B:
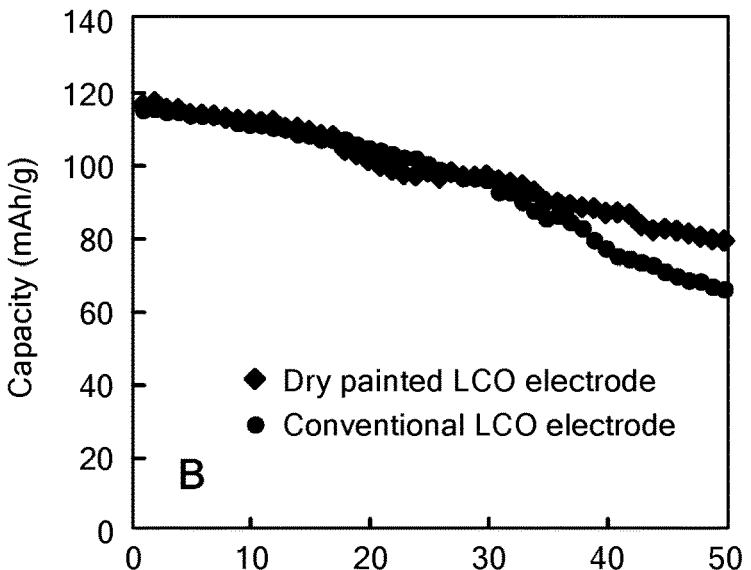
Figure 6C:
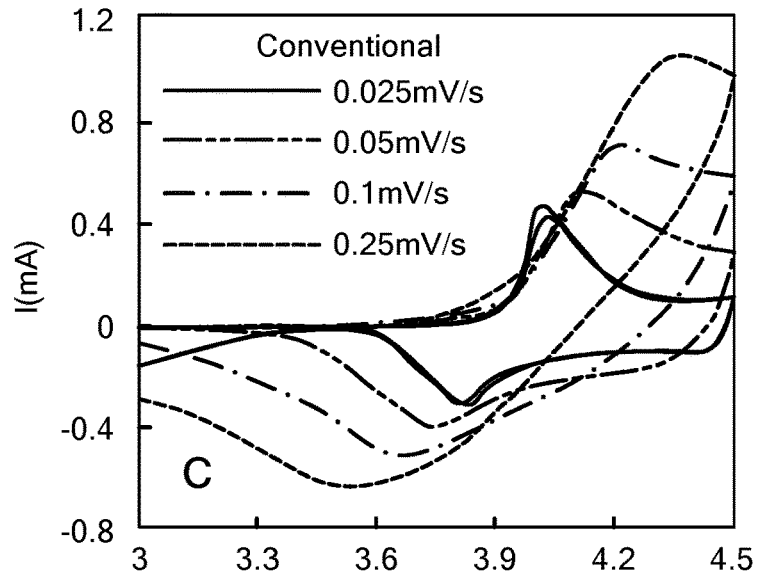
Figure 6D:
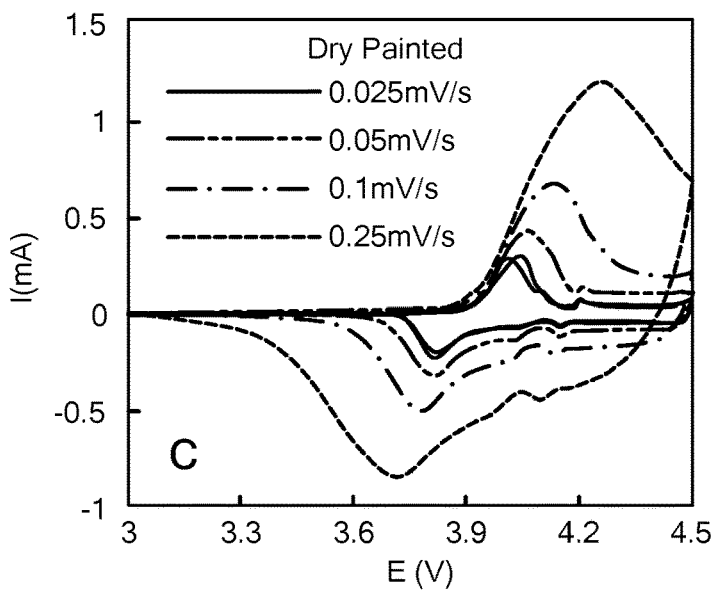
Figure 6E:
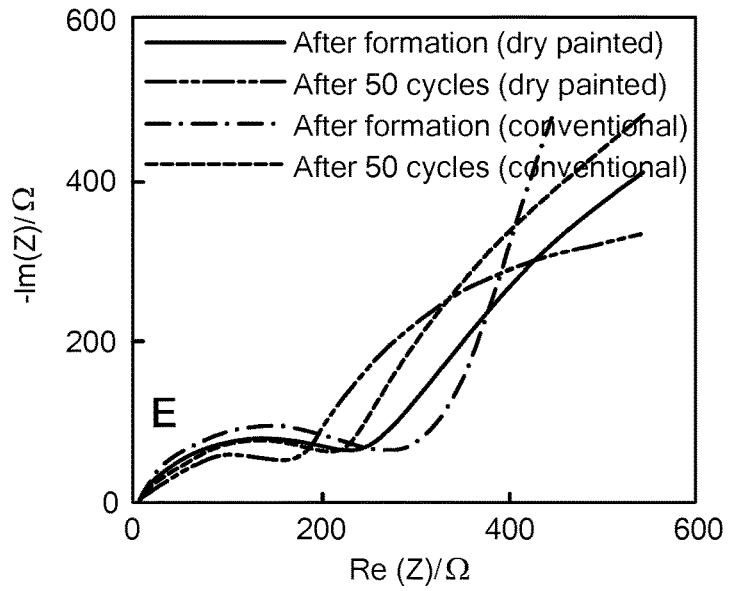
Figure 6F:
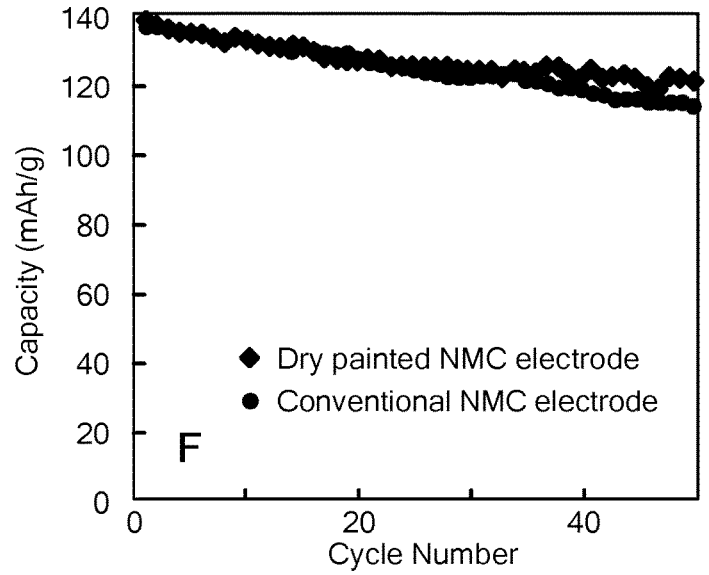

In implementation of rechargeable cells, the resulting electrode (substrate) 350 may be a cathode or anode for a rechargeable battery, and the spacing 390 between the molded structures 364 can be varied. A particle size of the constituent particles is between 50 nm-20 microns (0.02 mm) in an example configuration, FIGS. 6A-6F show attributes of the dry electrode mixture. FIG. 6A shows electrochemical characterization of rate performance of the dry painted and conventional $LiCoO_2$ (LCO) electrodes. FIG. 6B shows a cycling performance comparison between the dry painted and conventional LCO electrodes. FIG. 6C shows cyclic voltammetry of conventional LCO electrodes. FIG. 6D shows cyclic voltammetry of dry painted LCO electrodes. FIG. 6E shows a comparison of electrochemical impedance spectra between dry and conventional LCO electrodes. FIG. 6F shows cycling performance of the painted and conventional LiNi1/3Mn1/3Co1/3O2 (NMC) electrodes.

A direct comparison of electrochemical characteristics between dry painted electrodes and conventional slurry-casted electrodes has been performed using both types of electrodes consisting of 90% (by weight) LCO, 5% (by weight) carbon additive, and 5% (by weight) PVDF. The composition was selected to maximize the energy density while maintaining sufficient electron conductivity and mechanical integrity. The dry painted (after hot rolling) electrode has a free-standing porosity around 30%, while the conventional cast electrode porosity is about 50%. The conventional electrode was also pressed to around 30% for direct comparison with dry electrodes. Fig, shows the rate performance of the dry painted LCO electrodes at various discharge currents ranging from 0.1-3 C along with conventional slurry-cast electrodes. For the dry painted electrodes, the cell delivers a specific capacity of 121 mAhg-1 at 0.1 C, 89% of theoretical capacity (the theoretical capacity is 137 mAhg-1 for LCO over the voltage range 4.2-2.5 V vs. Li/Li+ because at the charge cut-off, 4.2 V, LCO is partially delithiated to $Li_{0.5}CoO_2$. At 0.2 C, 0.5 C, 1 C, 2 C and 3 C, the capacity lowered to 117 mAhg-1, 110 mAhg-1, 101 mAhg-1, 95 mAhg-1, and 87 mAhg-1, which are 86%, 80%, and 74%, 70%, and 64% of the theoretical capacity, respectively. Overall, the dry printed electrode has higher capacity than the conventional slurry-cast electrodes.

The cycling performance of the dry painted and conventional LCO electrode is shown in FIG. 6B. For the dry painted (deposited) electrode, the discharge capacity versus corresponding cycle number decays from 114 mAhg-1 in the initial cycle to 80 mAhg-1 after 50 charge/discharge cycles, 70% capacity retention at 0.5 C after 50 cycles. For the conventional electrode, after 50 cycles, only 58% capacity is retained. The painted electrode has higher cycling stability than the conventional electrodes (FIG. 3B).

To understand the mechanism that allows the dry painted electrodes to outperform the conventional electrodes, both electrodes were examined by Cyclic Voltammetry (CV) and electrochemical impedance spectra (EIS). FIGS. 6C-6D compare cyclic voltammograms of the painted and conventional LCO electrodes. At a scan rate of 0.025 mV/s, a single pair of oxidation and reduction peaks, the reduction peak at ~3.8 V and the oxidation peak at ~4 V corresponding to a Co3+/Co4+ redox couple, is observed for both electrodes, indicating the good reversibility of lithium insertion into and extraction from LCO. With the increased scan rate, the painted electrodes largely maintain the symmetrical shape of the cathodic peaks and the anodic peaks in their CV curves, whereas the shapes of the cathodic peaks and the anodic peaks change significantly for the conventional electrodes.

Moreover, the potential difference between the cathodic peak and the anodic peak at a certain scan rate in the painted electrode is smaller than that in the conventional one, indicating that the dry painted electrode has lower electrochemical polarization and better rate capability.

Nyquist plots of the painted and conventional LCO electrode/Li cell at fully discharged state are shown in FIG. 6E. Impedance is a collective response of kinetic processes with different time regimes. All the plots consist of an intercept with the Re(Z) axis, a high-frequency semicircle and a low-frequency tail. The intercept with the Re(Z) axis at high frequency refers to the total amount of Ohmic resistance, including electrolyte resistance and electric contact resistance. This resistance is much smaller than the other contributions of resistance. The semicircle can be attributed to the electrode-electrolyte interfacial impedance, while the tail attributed to the diffusion-controlled Warburg impedance. Both electrodes show slightly decrease in interfacial impedance with cycles. The width of the semicircle of the painted electrode is smaller than that of the conventional one, indicating that the dry painted electrode has slightly lower interfacial resistance. After cycling, the width of the semicircle of the painted electrode is still smaller than that of the conventional one.

Figure 7A:
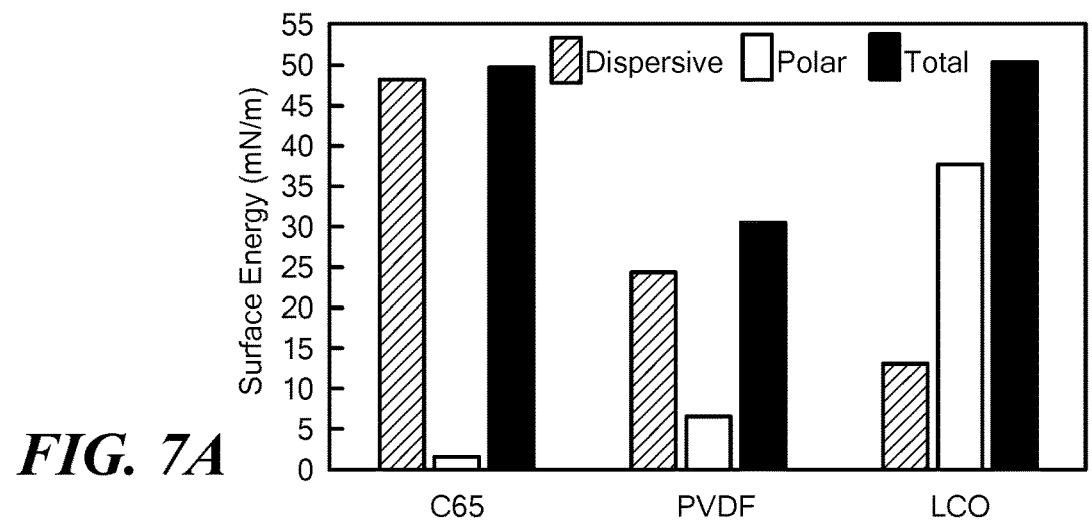
FIGS. 7A-7C show chemical properties of the dry electrode mixture.
Figure 7B:
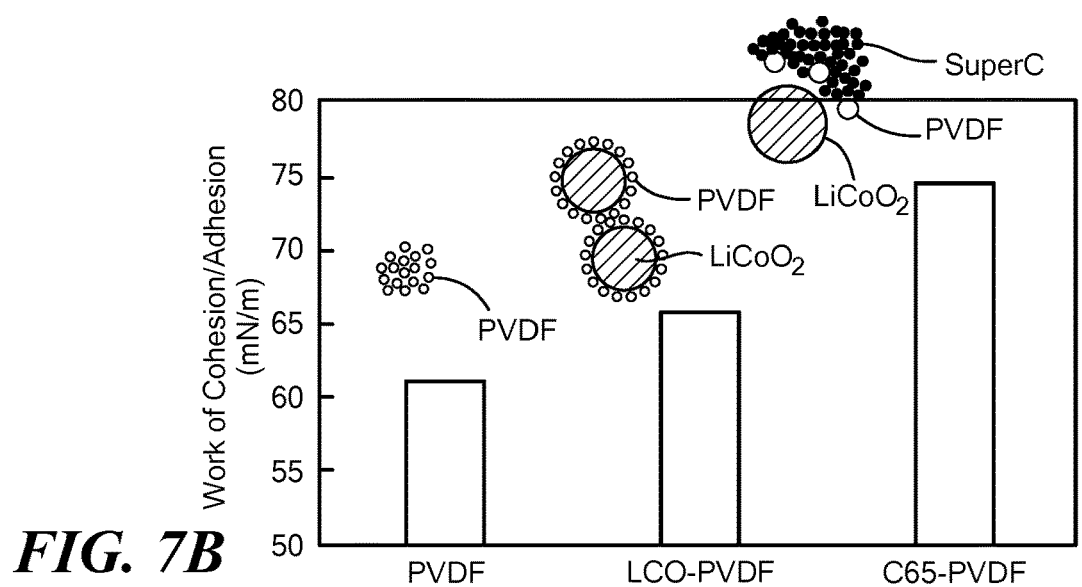
Figure 7C:
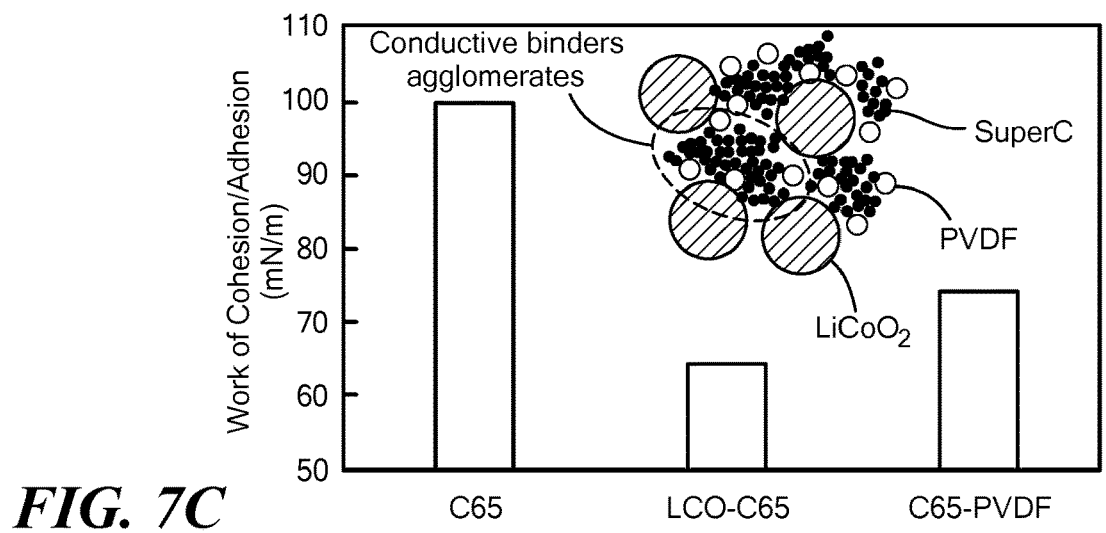

To prove its versatility of the dry manufacturing process, $LiNi_{1/3}Mn_{1/3}Co_{1/3}O_2$ (NMC) electrodes were also manufactured. The cycling performance of the painted and conventional NMC electrodes is shown in FIG. 6F. For the painted electrodes, the discharge capacity versus corresponding cycle number decays from 138 mAhg-1 in the initial cycle to 121 mAhg-1 after 50 charge/discharge cycles in the voltage of 2.8-4.3 V, meaning that there is 87% capacity retention at 0.5 C after 50 cycles. For the conventional electrodes, after 50 cycles, 84% capacity is retained. The painted electrodes have slightly better cyclability than the conventional ones. Other electrochemical characterizations, including the C-rate performance and CV comparisons, indicate dry painted NMC electrodes slightly outperform the conventional ones FIGS. 7A-7C show chemical properties of the dry electrode mixture. SEM micrographs showed a tendency for PVDF to attach and coat LCO particles without C65. When C65 is mixed in, the PVDF is stripped off of the LCO particles and readily coated by C65 particles. To understand this mixing behavior, surface energy measurements were conducted for LCO, C65, and PVDF to help explain the results of the mixing process and to help predict the mixing characteristics of various electrode materials. The sessile drop contact angle method was used to determine the polar and dispersive surface energy components for each of the materials used (FIG. 7A). LCO shows a strong polar component (37.57 mN/m) and a low relatively low dispersive component (12.75 mN/m). C65 shows opposite surface energy characteristics with it having a very large dispersive component (56.27 mN/m) and an almost non-existent polar component (0.54 mN/m). Polar and dispersive surface energy components for PVDF have values located between the respective values of LCO and C65. With LCO and C65 having extreme polar and dispersive components, they were found to heavily impact the distribution of PVDF throughout the composite. Using measured surface energy, the work of adhesion (cohesion) between two (single) materials can be calculated by Fowkes equation, $$W_{12}=2(\gamma_1^d\gamma_2^d)^{0.5}+2(\gamma_1^p\gamma_2^p)^{0.5}$$

where $\gamma1^d$ and $\gamma2^d$ are the dispersive surface energies of materials 1 and 2 while $\gamma1^p$ and $\gamma2^p$ are the polar surface energies. The work of adhesion calculated for PVDF to LCO and C65 show that they are higher than the work of cohesion for PVDF-PVDF contacts (FIG. 7B). This result shows that PVDF will more readily attach to LCO or C65 when either is present than to form PVDF agglomerations. The preferential adhesion of PVDF to LCO is desirable and will facilitate more even distribution throughout LCO particles and help increase the bonding performance. It should be noted that the work of adhesion between PVDF and C65 is stronger than that of PVDF and LCO. This helps to explain the observations in SEM micrographs where PVDF was shown to readily coat LCO particles but were subsequently stripped off and covered when C65 was introduced to the mixture. Work of adhesion calculations for C65 to LCO and PVDF show that C65 will preferably attach to C65 itself and form agglomerates FIG. 7C). Since adhesion between C65-PVDF is comparable to C65-C65, PVDF will be intermingled with C65 and form agglomerates ("conductive binder agglomerates") as shown in insert of FIG. 7C. Due to the weaker interactions of either C65 or PVDF with LCO, the "conductive binder" largely maintains its agglomeration form and merely distributes around LCO particles, as illustrated in FIG. 7C. This unique distribution, as reasoned from surface energy analysis, has also been verified by SEM micrographs which show the distributions of C65/binder agglomerates when mixed with LCO.

Furthermore, the measured surface energies can provide insight into the wetting behavior of melted PVDF particles. Using the Fowkes equation, $$(\gamma_s^d\gamma_l^d)^{0.5}+(\gamma_s^p\gamma_l^p)^{0.5}=0.5\gamma_l(l+\cos(\theta))$$

where subscript s and l represent LCO and PVDF, superscripts d and p represent dispersive and polar components, and $\Theta$ is the contact angle. Using the surface energy components previously found for LCO and PVDF, the calculation shows that PVDF will completely wet LCO surface upon melting. Therefore, full coverage of PVDF on LCO can be expected which agrees with SEM images. Certainly, with the presence of C65, the wetting of PVDF on LCO will be hindered. The different manufacturing processes will result in different binder distributions and hence the electromechanical properties of the electrodes will vary. In the porous electrode composite, ions move through the liquid electrolyte that fills the pores of the composite. Electrons are conducted via chains of carbon particles through the composite to the current collector. PVDF holds together the active material particles and carbon additive particles into a cohesive, electronically conductive film, and provide the adhesion between the film and the current collector.

It has been established that when it is in contact with the surface of particles, a polymer tends to chemically bond or physically absorb to form a bound polymer layer on the surface of the particles of active material and carbon additive, and polymer chains tend to aligning with the surface. This bound polymer layer can interact with adjacent polymer layer to form the immobilized polymer layers due to reduced mobility. Bound and immobilized layers together are considered as fixed polymer layers. Following the formation of fixed polymer layers on particle surfaces, free polymer domains start to appear. The free binder polymers are crucial to the mechanical strength of the electrodes. Due to the substantially large surface area of active material and carbon additive present in electrodes, almost all of binder polymers are in the fixed state, and very limited polymers are free. Therefore, for a given electrode manufacturing method, the electrode composition and binder distribution has a significant effect on electrochemical properties.

Those skilled in the art should readily appreciate that the programs and methods for the controller and associated logic defined herein are deliverable to a computer processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In battery electrode manufacturing, a method of depositing an electrode material on a planar substrate comprising:
   depositing onto a substrate defined by a planar electrode, a dry electrode mixture resulting from a combination of a plurality of types of constituent particles, the particle types including at least an active charge material and a binder, depositing further including:
   generating a fluidized mixture of constituent particles of the dry electrode mixture using a carrier gas;
   dispensing the dry electrode mixture onto a mold, the mold having an array of receptacles, each receptacle defining a shape and a spacing from adjacent receptacles to form a plurality of molded structures on the substrate;
   inverting the mold onto the substrate; and
   releasing the molded structures onto the substrate for forming a deposition pattern on the substrate corresponding to the array of receptacles;
   heating the deposited mixture to activate the binder for adhering the mixture to the substrate; and
   compressing the deposited mixture using heated rollers to a thickness for eliminating gaps between the molded structures and forming a continuous layer of charge material for achieving an electrical sufficiency of the compressed, deposited mixture as an electrode in a battery.

2. The method of claim 1 wherein the mold is a cylindrical roller adapted to receive the dispensed dry electrode mixture into the receptacles and invert the receptacles by rotation to a release position onto the substrate, the substrate operable for conveyance at a speed corresponding to the rotation.

3. The method of claim 1 further comprising disposing a scraper across a top surface of the mold, the top surface receiving overspray particles from the receptacles and the disposed scraper removing the overspray particles from the top surface.

4. The method of claim 1 further comprising dispensing the dry electrode mixture onto the mold in a plurality of passes, each pass dispensing a layer, and repeating the dispensing until the dispensed mixture achieves a predetermined thickness.

5. The method of claim 4 further comprising dynamically adjusting a combination ratio of the dispensed mixture, the combination ratio defining, for each layer, a percentage of each of the types of the plurality of types of particles.

6. The method of claim 5 wherein dispensing further comprises:
   identifying a plurality of the types of constituent particles;
   metering a quantity of each of the plurality of types based on a predetermined combination ratio;
   generating the fluidized mixture of the constituent particles according to the metered quantity using the carrier gas; and
   directing the fluidized mixture driven by the carrier gas.

7. The method of claim 1 further comprising:
   dispensing a plurality of layers in the receptacles, each layer defined by a predetermined ratio of the types of constituent particles to define molded structures having a composition defined by the layers, the constituent particles disposed from hoppers including at least a binder, a conductor and a charge material as the types of constituent particles,
   the predetermined ratio at each layer achieved by metering a dispensed quantity of particles from each of the hoppers according to the predetermined ratio.

8. The method of claim 1 wherein the substrate is a cathode or anode plate for a rechargeable battery, and the spacing between the molded structures is between 1.0 mm and 0.3 mm.

9. The method of claim 1 wherein the electrical sufficiency of the charge material occurs from the thickness reduction to 25% of an initial thickness of the deposited electrode mixture, and the initial thickness of the deposited mixture is between 0.2 mm to 3.0 mm.

10. The method of claim 1 wherein a particle size of the constituent particles is between 50 nm-20 microns (0.02 mm).

11. The method of claim 1 wherein heating is performed by heated rollers have a temperature between 100° C. and 300° C.

12. The method of claim 1 further comprising forming the planar electrode having the deposited mixture into a cathode or anode of a manufactured battery.

13. The method of claim 1 wherein the dry electrode mixture includes active materials, binder and conductive additive, the active materials selected from the group consisting of $LiCoO_2$, $LiNixMnyCozO_2$, $LizMn_2O_4$, $LiNiCoAlO_2$, $LiFePO_4$ and $Li_4Ti_5O_{12}$, the binder selected from the group consisting of PVDF and CMC, and the conductive additive selected from the group consisting of carbon powder, nanotube, nanowire, and graphene.

14. The method of claim 1 further comprises forming the electrodes with thickness from substantially around 3 micrometer to 3 mm and having a uniform composition or a gradient composition of the thickness.

15. The method of claim 1 further comprising forming the dry electrode mixture by:
  applying a high speed mixer to homogeneously mix a dry form of the constituent particles at a rotor spinning speed of up to 16,000 RPM for a predetermined duration; and
  applying high speed mechanical impact during dry mixing to achieve hybridization of constituent particles and high level of mixing, such that the hybridization is operable to embed or coat one type of particle into or onto another type of particle.

* * * * *